United States Patent
Zhao et al.

(10) Patent No.: US 9,326,000 B2
(45) Date of Patent: Apr. 26, 2016

(54) METHOD AND SYSTEM FOR STILL IMAGE ENCODING AND RANDOM ACCESS DECODING

(71) Applicant: OmniVision Technologies (Shanghai) Co., Ltd., Shanghai (CN)

(72) Inventors: Yihong Zhao, Shanghai (CN); Jizhang Shan, Shanghai (CN)

(73) Assignee: OmniVision Technologies (Shanghai) Co., Ltd., Shanghai (CN)

(*) Notice: Subject to any disclaimer, the term of this patent is extended or adjusted under 35 U.S.C. 154(b) by 22 days.

(21) Appl. No.: 14/322,835

(22) Filed: Jul. 2, 2014

(65) Prior Publication Data

US 2016/0007037 A1 Jan. 7, 2016

(51) Int. Cl.

| | |
|---|---|
| *G06K 9/36* | (2006.01) |
| *H04N 19/44* | (2014.01) |
| *H04N 19/40* | (2014.01) |
| *H04N 19/93* | (2014.01) |
| *H04N 19/18* | (2014.01) |
| *H04N 19/176* | (2014.01) |
| *H04N 19/91* | (2014.01) |
| *H04N 19/124* | (2014.01) |
| *G06T 9/00* | (2006.01) |
| *H04N 19/14* | (2014.01) |

(52) U.S. Cl.
CPC ............ *H04N 19/45* (2014.11); *H04N 19/124* (2014.11); *H04N 19/176* (2014.11); *H04N 19/18* (2014.11); *H04N 19/40* (2014.11); *H04N 19/91* (2014.11); *H04N 19/93* (2014.11); *G06T 9/007* (2013.01); *H04N 19/14* (2014.11)

(58) Field of Classification Search
CPC ....... H04N 19/91; H04N 19/93; H04N 19/48; H04N 19/18; H04N 19/176; H04N 19/124; H04N 19/129; H04N 19/14; G06T 9/007; G06T 9/005

USPC .......................... 382/232–233, 245, 250, 251
See application file for complete search history.

(56) References Cited

U.S. PATENT DOCUMENTS

| | | | | |
|---|---|---|---|---|
| 6,301,304 B1* | 10/2001 | Jing | ...................... | H04N 19/61 375/240.25 |
| 6,314,208 B1* | 11/2001 | Konstantinides | ....... | G06T 9/005 382/239 |
| 6,587,590 B1* | 7/2003 | Pan | ...................... | G06F 17/147 382/250 |
| 7,242,328 B1* | 7/2007 | Chen | ...................... | H03M 7/40 341/50 |
| 2004/0150538 A1* | 8/2004 | Kim | ...................... | H03M 7/40 341/67 |

* cited by examiner

*Primary Examiner* — Kanjibhai Patel
(74) *Attorney, Agent, or Firm* — Blakely Sokoloff Taylor & Zafman LLP

(57) ABSTRACT

Methods and systems for JPEG encoding and decoding are disclosed. In the encoding method, an image is split into 8×8 pixel blocks and the 8×8 pixel blocks are grouped into a number of minimum coded units (MCU's), such that each MCU consists of a constant number of 8×8 pixel blocks. The MCU's are then scanned to forward discrete cosine transform, quantization, zigzag scanning and entropy encoding processes and are subsequently converted into bitstreams according to entropy encoding coding tables. In the entropy encoding process, AC coefficients are run-length encoded, while DC coefficients are not subjected to differential pulse-code modulation. The bitstreams are byte-aligned by stuffing zeroes and compression data for a special JPEG file are generated from the byte-aligned bitstreams. A position table is established, recording positions of the bitstreams in the compression data. The method enables fast positioning of bitstreams corresponding to an image region of interest.

16 Claims, 10 Drawing Sheets

METHOD AND SYSTEM FOR STILL IMAGE ENCODING AND RANDOM ACCESS DECODING

TECHNICAL FIELD

The present invention relates to methods and systems for still image encoding and decoding that support decoding at a random access point.

BACKGROUND

Commonly used JPEG baseline encoding and decoding methods of the prior art all consist of the steps of splitting an image into minimum coded units (MCU's) and sequentially performing DCT, quantization and entropy coding processes on the MCU's, in the order where the MCU's are raster scanned.

FIG. 1 is a flow diagram illustrating the principal steps of a compression algorithm executed by a standard JPEG encoder, including:
 a) division of an image into blocks of 8×8 pixels;
 b) forward discrete cosine transformation (FDCT);
 c) quantization;
 d) zigzag scanning; and
 e) entropy coding, accomplished by subjecting DC coefficients to differential pulse-code modulation (DPCM) and AC coefficients to run-length coding (RLC).

Due to the occurrence of data correlation of JPEG bitstream, for example, in the DPCM of DC coefficients, decoding of a JPEG file generated by this algorithm must be done from the beginning of the compression data even when the JPEG file has a large size and the region of interest (ROI) only accounts for a small part of the image. That is, the algorithm does not allow decoding at a random access point. This disadvantageously necessitates a display cache large enough to store the whole JPEG file to ensure a sufficient display speed.

FIG. 2 depicts a flowchart illustrating the principal steps of a decompression algorithm executed by the standard JPEG encoder, including:
 1) entropy decoding, including run-length decoding (RLD) for recovering AC components and inverse DPCM for recovering DC components;
 2) inverse quantization;
 3) inverse zigzag scanning;
 4) inverse discrete cosine transformation (IDCT); and
 5) image reconstruction based on the reconstructed 8×8 pixel blocks.

The existing solutions for random-access-point decoding basically follow the approach of inserting, during the compression encoding process, restart markers or other separators between MCUs in bitstreams. However, these approaches still require a thorough scan of the whole compression data of the JPEG file to find out positions of the MCUs in bitstreams corresponding to the restart markers or separators. In particular, using the separators further necessitates differential pulse-code demodulation of each DC coefficient, thus increasing the amount of calculation payload and requiring an additional storage space for storing the DC coefficients.

SUMMARY OF INVENTION

It is therefore an objective of the present invention to provide methods and systems for still image encoding and random access decoding, which enable fast positioning of MCU bitstreams corresponding to an image region of interest without completely scanning the compression data of the special JPEG file and independent decompression of each MCU, thereby allowing decoding at a random access point, namely, decompression of part of an image.

To that end, the invention provides, in one aspect, a JPEG encoding method that supports decoding at a random access point. The method includes: splitting an image into 8×8 pixel blocks and grouping the 8×8 pixel blocks into a number of minimum coded units according to a format of the image, such that each minimum coded unit consists of a constant number of 8×8 pixel blocks; scanning the minimum coded units in a raster scan order, by subjecting each of the minimum coded units sequentially to forward discrete cosine transformation for converting the 8×8 pixel blocks of each of the minimum coded units into discrete cosine transformation (DCT) coefficients, quantization of the DCT coefficients according to a quantization table to obtain quantized DCT coefficients, zigzag scanning the quantized DCT coefficients to obtain sequenced DCT coefficients sequenced from a lowest frequency to a highest frequency, and entropy encoding for converting the sequenced DCT coefficients into bitstreams in correspondence with the minimum coded units, wherein the sequenced DCT coefficients include AC coefficients and DC coefficients, and the entropy encoding is accomplished by run-length encoding the AC coefficients while not performing differential pulse-code modulation on the DC coefficients; aligning the bitstreams by byte stuffing to obtain byte-aligned bitstreams in correspondence with the minimum coded units; generating compression data of a special JPEG file from the byte-aligned bitstreams; acquiring, in the raster scan order, positions of the byte-aligned bitstreams in correspondence with the minimum coded units in the compression data of the special JPEG file, wherein a position of a first byte-aligned bitstream is recorded as zero; and encoding the positions by a run-length coding and compressing the encoded positions by a Huffman coding to establish a position table.

Further, the image may be of a YUV format.

Further, the byte stuffing may include inserting zeros to align the bitstreams.

Further, the positions of the byte-aligned bitstreams in correspondence with the minimum coded units in the compression data of the special JPEG file may be recorded in the position table in storage spaces having a same size.

Further, the same size of the storage spaces may be 4 bytes.

Further, the special JPEG file may include, besides the compression data, a start of image (SOI), an end of image (EOI), tables and a frame header/scan header, respectively the same as an SOI, an EOI, tables and a frame header/scan header of a standard JPEG file.

Further, the method may further include the following steps after generating compression data of a special JPEG file or after establishing a position table: transcoding the header of the special JPEG file to a standard header by adding thereto a JPEG DRI marker that specifies a restart interval between the minimum coded units, wherein the JPEG DRI marker code is "0x FF DD 00 04 00 01"; transcoding the compression data of the special JPEG file to standard compression data by inserting therein a restart marker at the end of each of the minimum coded units, wherein the restart marker is inserted, with 2 bytes thereof cycling from "0x FF D0" to "0x FF D7"; and creating a standard JPEG file from the standard compression data, the SOI, the EOI, the tables and the frame header/scan header.

In this aspect, the invention also provides a method for decoding the special JPEG file generated from the JPEG encoding method. The decoding method includes: determining, based on a top-left corner entry, a width and a height of an image region of interest, a position of a byte-aligned bitstream of a minimum coded unit in correspondence with the image region of interest in the compression data of the special JPEG file; extracting byte-aligned bitstreams from the compression data of the special JPEG file according to the determined position, and entropy decoding the extracted bitstreams to obtain corresponding quantized DCT coefficients sequenced from a lowest frequency to a highest frequency, wherein the quantized DCT coefficients include AC coefficients and DC coefficients, and the entropy encoding is accomplished by run-length encoding the AC coefficients while not performing differential pulse-code modulation on the DC coefficients; inverse quantizing the sequenced, quantized DCT coefficients to obtain inverse-quantized DCT coefficients; performing an inverse zigzag scan on the inverse-quantized DCT coefficients to rearrange the inverse-quantized DCT coefficients in a raster scan order; converting the rearranged DCT coefficients into reconstructed 8×8 pixel blocks using an inverse discrete cosine transformation; and combining the reconstructed 8×8 pixel blocks together in the raster scan order to generate an image.

In another aspect, the invention provides a JPEG encoding system that supports decoding at a random access point. The system includes an image splitting module for splitting an image into 8×8 pixel blocks and grouping the 8×8 pixel blocks into a number of minimum coded units according to a format of the image, such that each of the minimum coded units consists of a constant number of 8×8 pixel blocks; a scanning module for scanning the minimum coded units in a raster scan order, by subjecting each of the minimum coded units sequentially to forward discrete cosine transformation for converting the 8×8 pixel blocks of each of the minimum coded units into discrete cosine transformation (DCT) coefficients, quantization of the DCT coefficients using a quantization table to obtain quantized DCT coefficients, zigzag scanning the quantized DCT coefficients to obtain sequenced DCT coefficients sequenced from a lowest frequency to a highest frequency, and entropy encoding for converting the sequenced DCT coefficients into bitstreams in correspondence with the minimum coded units, wherein the sequenced DCT coefficients include AC coefficients and DC coefficients, and the entropy encoding is accomplished by run-length encoding the AC coefficients while not performing differential pulse-code modulation on the DC coefficients; an aligning module for aligning the bitstreams by byte stuffing to obtain byte-aligned bitstreams in correspondence with the minimum coded units; a generating module for generating compression data of a special JPEG file from the byte-aligned bitstreams; and a position-table module for acquiring, in the raster scan order, positions of the byte-aligned bitstreams in correspondence with the minimum coded units in the compression data of the special JPEG file, encoding the positions by a run-length coding and compressing the encoded positions by a Huffman coding to establish a position table, wherein a position of a first byte-aligned bitstream is recorded as zero.

Further, the image may be of a YUV format.

Further, the aligning module may align the bitstreams by inserting zeros.

Further, the positions of the byte-aligned bitstreams in correspondence with the minimum coded units in the compression data of the special JPEG file may be recorded in the position table in storage spaces having a same size.

Further, the same size of the storage spaces may be 4 bytes.

Further, the generating module may be further configured to generate an SOI, an EOI, tables and a frame header/scan header respectively as same as an SOI, an EOI, tables and a frame header/scan header of a standard JPEG file.

Further, the system may further include a transcoding module configured to: transcode the header of the special JPEG file to a standard header by adding thereto a JPEG DRI marker that specifies a restart interval between the minimum coded units, wherein the JPEG DRI marker is "0x FF DD 00 04 00 01"; transcode the compression data of the special JPEG file to standard compression data by inserting therein a restart marker at the end of each of the minimum coded units, wherein the restart markers is inserted, with 2 bytes thereof cycling from "0x FF D0" to "0x FF D7"; and create a standard JPEG file from the standard compression data, the SOI, the EOI, the tables and the frame header/scan header.

In this aspect, the invention also provides a system for decoding the special JPEG file generated from the JPEG encoding system. The decoding system includes: a position module for determining, based on a top-left corner entry, a width and a height of an image region of interest, a position of a byte-aligned bitstream of a minimum coded unit in correspondence with the image region of interest in the compression data of the special JPEG file; an entropy decoding module for extracting byte-aligned bitstreams from the compression data of the special JPEG file according to the determined position, and entropy decoding the extracted bitstreams to obtain corresponding quantized DCT coefficients sequenced from a lowest frequency to a highest frequency, wherein the quantized DCT coefficients include AC coefficients and DC coefficients, and the entropy encoding is accomplished by run-length encoding the AC coefficients while not performing differential pulse-code modulation on the DC coefficients; an inverse-quantization module for inverse quantizing the sequenced, quantized DCT coefficients to obtain inverse-quantized DCT coefficients; an inverse-zigzag-scan module for performing an inverse zigzag scan on the inverse-quantized DCT coefficients to rearrange the inverse-quantized DCT coefficients in a raster scan order; an IDCT module for converting the rearranged DCT coefficients into reconstructed 8×8 pixel blocks using an inverse discrete cosine transformation; and a combination module for combining the reconstructed 8×8 pixel blocks together in the raster scan order to generate an image.

Advantageously, the encoding method and system of the present invention can enable fast positioning of the byte-aligned MCU bitstreams corresponding to an image region of interest without completely scanning the compression data of the special JPEG file and independent decompression of each of the MCU's, thereby allowing decoding at a random access point, namely, decompression of part of an image, by: splitting an image into 8×8 pixel blocks and grouping the 8×8 pixel blocks into a number of minimum coded units according to a format of image, such that each minimum coded unit consists of a constant number of 8×8 pixel blocks; scanning the minimum coded units in a raster scan order, by subjecting each of the minimum coded units sequentially to forward discrete cosine transformation for converting the 8×8 pixel blocks of each of the minimum coded units into discrete cosine transformation (DCT) coefficients, quantization of the DCT coefficients according to a quantization table to obtain quantized DCT coefficients, zigzag scanning the quantized DCT coefficients to obtain sequenced DCT coefficients sequenced from a lowest frequency to a highest frequency, and entropy encoding for converting the sequenced DCT coefficients into bitstreams in correspondence with the minimum coded units, wherein the sequenced DCT coefficients include AC coefficients and DC coefficients, and the entropy encoding is accomplished by run-length encoding the AC coefficients while not performing differential pulse-code modulation on the DC coefficients; aligning the bitstreams by byte stuffing to obtain byte-aligned bitstreams in correspondence with the minimum coded units; generating compression data of a special JPEG file from the byte-aligned bitstreams; and establishing a position table to record, in the raster scan order, positions of the byte-aligned bitstreams in correspondence with the minimum coded units in the compression data of the special JPEG file.

Also advantageously, the decoding method and system of the invention can also enable fast positioning of the byte-aligned MCU bitstreams corresponding to an image region of interest without completely scanning the compression data of the special JPEG file and independent decompression of each of the MCU's, thereby allowing decoding at a random access point, namely, decompression of part of an image, by: determining, based on a top-left corner entry, a width and a height of an image region of interest, a position of a byte-aligned bitstream of a minimum coded unit in correspondence with the image region of interest in the compression data of the special JPEG file; extracting byte-aligned bitstreams from the compression data of the special JPEG file according to the determined position, and entropy decoding the extracted bitstreams to obtain corresponding quantized DCT coefficients sequenced from a lowest frequency to a highest frequency, wherein the quantized DCT coefficients include AC coefficients and DC coefficients, and the entropy encoding is accomplished by run-length encoding the AC coefficients while not performing differential pulse-code modulation on the DC coefficients; inverse quantizing the sequenced, quantized DCT coefficients to obtain inverse-quantized DCT coefficients; performing an inverse zigzag scan on the inverse-quantized DCT coefficients to rearrange the inverse-quantized DCT coefficients in a raster scan order; converting the rearranged DCT coefficients into reconstructed 8×8 pixel blocks using an inverse discrete cosine transformation; and combining the reconstructed 8×8 pixel blocks together in the raster scan order to generate an image.

Still advantageously, the encoding and decoding methods and systems of the invention can conveniently transcode the special JPEG file to a standard JPEG file by: transcoding the header of the special JPEG file to a standard header by adding thereto a JPEG DRI marker that specifies a restart interval between the minimum coded units, wherein the JPEG DRI marker is "0x FF DD 00 04 00 01"; transcoding the compression data of the special JPEG file to standard compression data by inserting therein a restart marker at an end of each of the minimum coded units, wherein the restart markers is inserted, with 2 bytes thereof cycling from "0x FF D0" to "0x FF D7"; and creating a standard JPEG file the standard compression data, the SOI, the EOI, the tables and the frame header/scan header.

DETAILED DESCRIPTION

The above and other purposes, features and advantages of the present invention will become more apparent from the detailed description set forth below when taken in conjunction with the drawings.

Example 1

FIGS. 3A to 6 show a still image encoding method that supports decoding at a random access point and includes the following steps S1 to S5.

In step S1, an input image is split into 8×8 pixel blocks which are then grouped into a number of minimum coded units (MCU's) according to the format of the image, such that each of the MCU's consists of a constant number of 8×8 pixel blocks.

Preferably, the format of the image is a YUV format, such as YUV422, YUV444 or YUV420.

Figure 6:
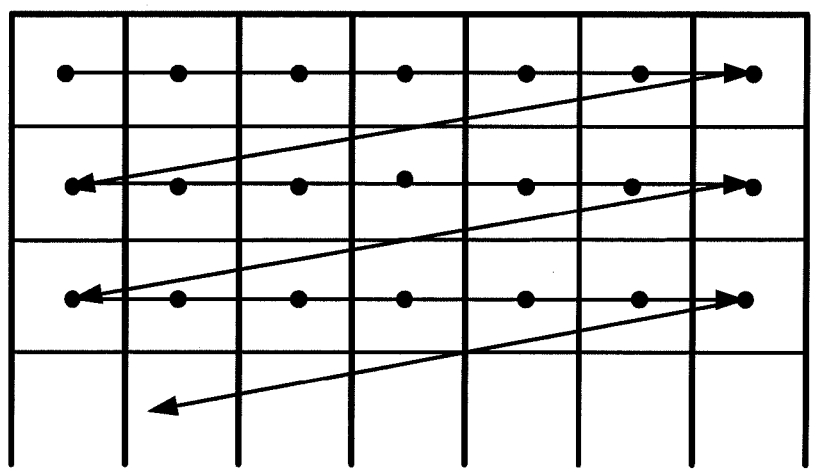
FIG. 6 schematically illustrates the raster scan order in accordance with embodiments of the invention.

In step S2, the MCU's of the image are raster scanned and then processed in the raster scan order, as illustrated in FIG. 6. Scanning the MCU's in the raster scan order further includes the following steps (i.e., steps S21 to S24):

S21: using a forward discrete cosine transform (FDCT) to convert the 8×8 pixel blocks of each of the MCU's into DCT coefficients;

S22: quantizing the DCT coefficients to obtain quantized DCT coefficients;

S23: zigzag scanning the quantized DCT coefficients to obtain sequenced DCT coefficients sequenced from the lowest frequency to the highest frequency; and S24: entropy encoding the sequenced DCT coefficients to generate a bitstream, wherein the AC coefficients in the sequenced DCT coefficients are run-length encoded, while the DC coefficients therein is not subjected to differential pulse-code modulation (DPCM).

In step S3, the bitstreams of the MCU's are aligned by byte stuffing to obtain byte-aligned bitstreams in correspondence with the MCU's.

Preferably, the byte alignment is accomplished by inserting zeros. Specifically, in steps S2 and S3, each of the MCU's undergoes, in the raster scan order, the same FDCT, quantization and zigzag scanning processes as in a standard JPEG encoder. However, the method of the invention differs from that of the standard JPEG encoder in not subjecting the DC coefficients to DPCM during the entropy encoding and in byte aligning the corresponding MCU bitstreams in the same manner such as, for example, by inserting zeros in each of them.

In step S4, compression data for a special JPEG file are generated from the byte-aligned bitstreams of the MCU's.

Preferably, besides the compression data, the special JPEG file further contains SOI, EOI, Tables and Frame header/Scan header. The header can keep the same format as the header of a standard JPEG file. Additionally, for commercially available hardware encoders of some types, the header may be made in a stereotype format and even assume a fixed size. Furthermore, the EOI of the special JPEG file can be created in the same manner as how a standard JPEG encoder generates EOI for a standard JPEG file, i.e., adding a 2-byte EOI "0x FF D9" to the end of the special JPEG file, namely immediately after the last byte-aligned MCU bitstream.

In step S5, a position table recording, in the raster scan order, positions of the byte-aligned bitstreams in correspondence with the MCU's in the compression data, as shown in FIG. 6, is established. Each cell of the table holds information indicative of the position of the byte-aligned bitstream of a corresponding MCU.

Preferably, the position table records each position of the byte-aligned MCU bitstreams in storage spaces of the same size, and the same size of the storage spaces is preferred to be 4 bytes. In a specific embodiment, in the position table, each position of the byte-aligned MCU bitstreams is stored in the order where the MCU's are raster scanned, each in a space of 4 bytes, as values ascending from zero (i.e., the position of the first byte-aligned MCU bitstream is recorded as the value zero), taking one bit as the minimum recording unit (for large-sized images, one byte can also be used as the minimum recording unit). As such, the number of total bytes storing the position table is 4 times the number of the MCU's. For example, in accordance with this method, a VGA image in the format of YUV422 will be divided into (640/16)×(480/8) =2400 MCU's and a position table for storing their bitstream positions having a size of 2400×4=9600 bytes will be established. Since the position of the first byte-aligned MCU bitstream is recorded as the value zero, the position table may include a great number of "zeros". To reduce the size of the position table, after acquiring the positions of the byte-aligned MCU bitstreams, the positions can be encoded by run-length coding (RLE) and then compressed by Huffman coding, as such, the number of total bytes storing the position table is greatly decreased. In addition, by using different coding methods to compress the position table, the confidentiality of the position data can be greatly increased, so that this method can be adapted to occasions where encryption is required.

Figure 5:
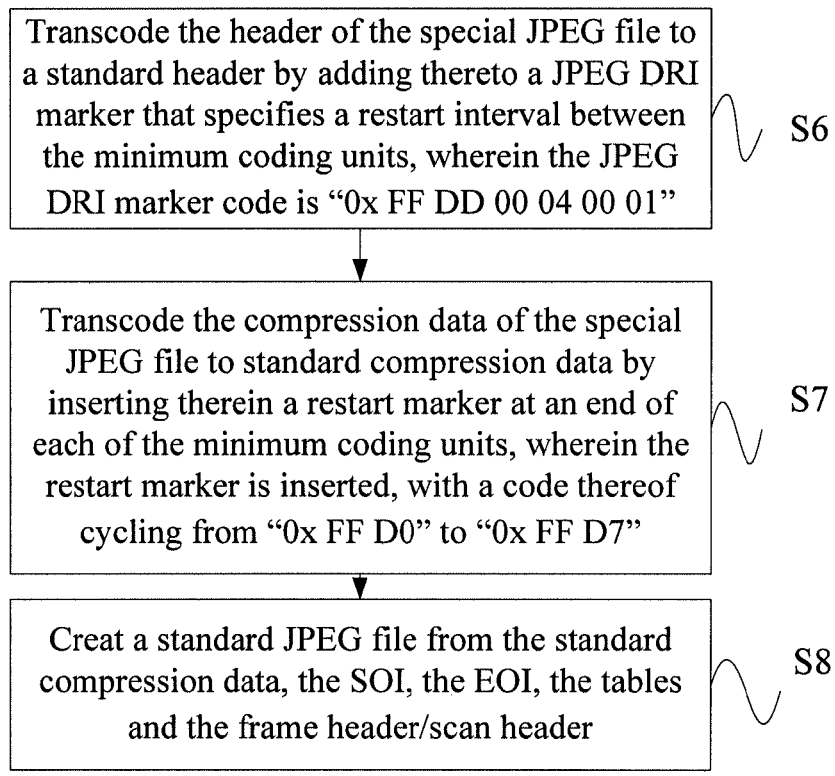
FIG. 5 is a flowchart representing the process of converting the special JPEG file into a standard JPEG file of the method of FIG. 3A.

Preferably, as shown in FIG. 5, the method further includes the following steps S6 to S8 for transcoding the special JPEG file to a stand JPEG file, after Step 4 or Step 5.

In Step S6, the header of the special JPEG file is transcoded to a standard JPEG file header by adding thereto a JPEG DRI marker that specifies a restart interval between the MCU's. The JPEG DRI marker may be "0x FF DD 00 04 00 01".

In Step S7, the compression data of the special JPEG file are transcoded to standard JPEG compression data by inserting therein restart markers, each immediately after a MCU bitstream. The restart markers may be inserted, with 2 bytes cycling from "0x FF D0" to "0x FF D7". More specifically, in accordance with the JPEG standard, each MCU bitstream may be added, by querying the position table or during the encoding process, with a restart marker immediately next to the end thereof, which cycles in value from 0 to 7 (i.e., m=0, ..., 7).

In Step S8, a standard JPEG file is created from the standard JPEG compression data and SOI, EOI, Tables and Frame header/Scan header of the special JPEG file. As such, the special JPEG file can be conveniently transcoded to a standard JPEG file.

Advantageously, the method in this example can enable fast positioning of byte-aligned MCU bitstreams corresponding to an image region of interest without completely scanning the compression data of the special JPEG file and independent decompression of each of the MCU's, thereby allowing decoding at a random access point, namely, decompression of part of an image.

Figure 1:
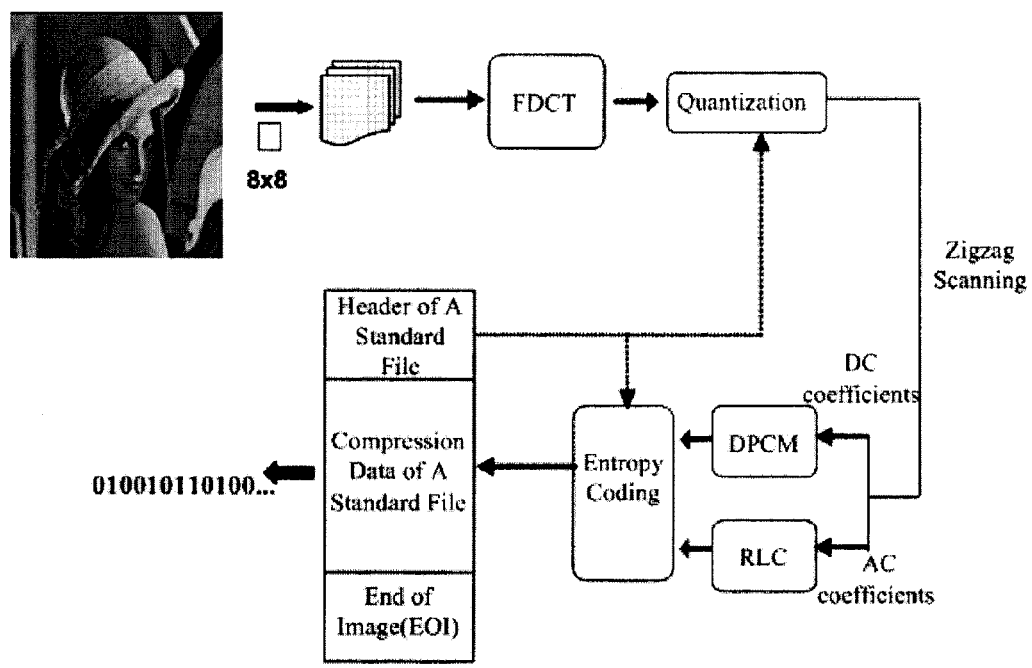
FIG. 1 depicts a flowchart graphically illustrating an encoding method implemented by a standard JPEG encoder of the prior art.
Figure 2:
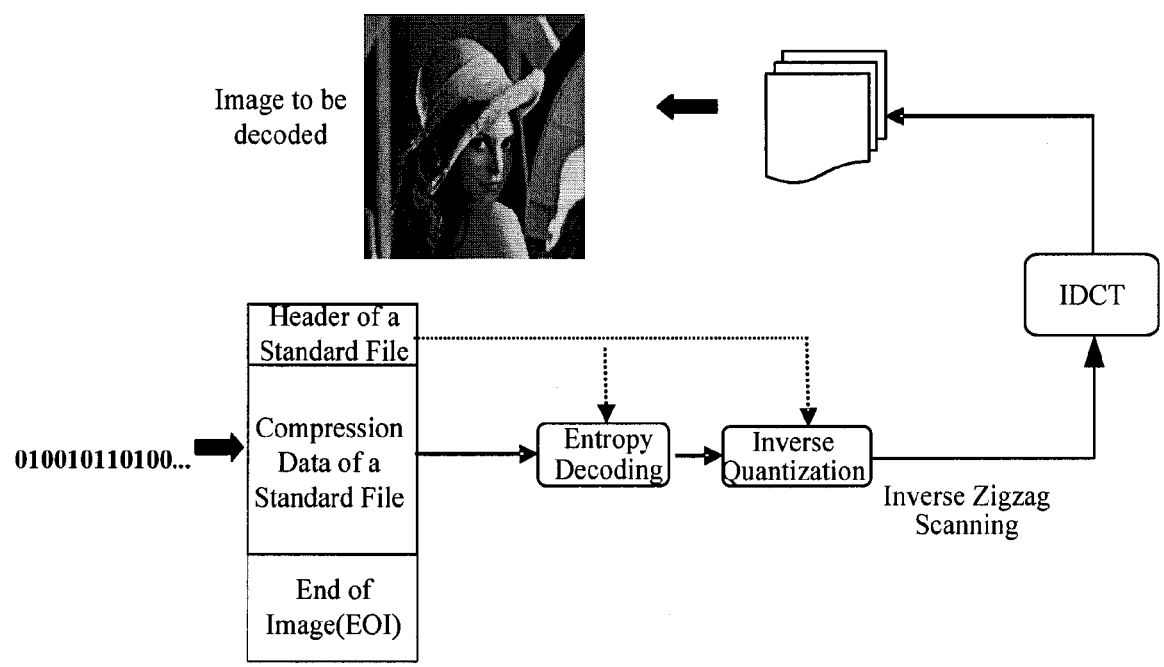
FIG. 2 depicts a flowchart graphically illustrating a decoding method implemented by a standard JPEG decoder of the prior art.
Figure 3A:
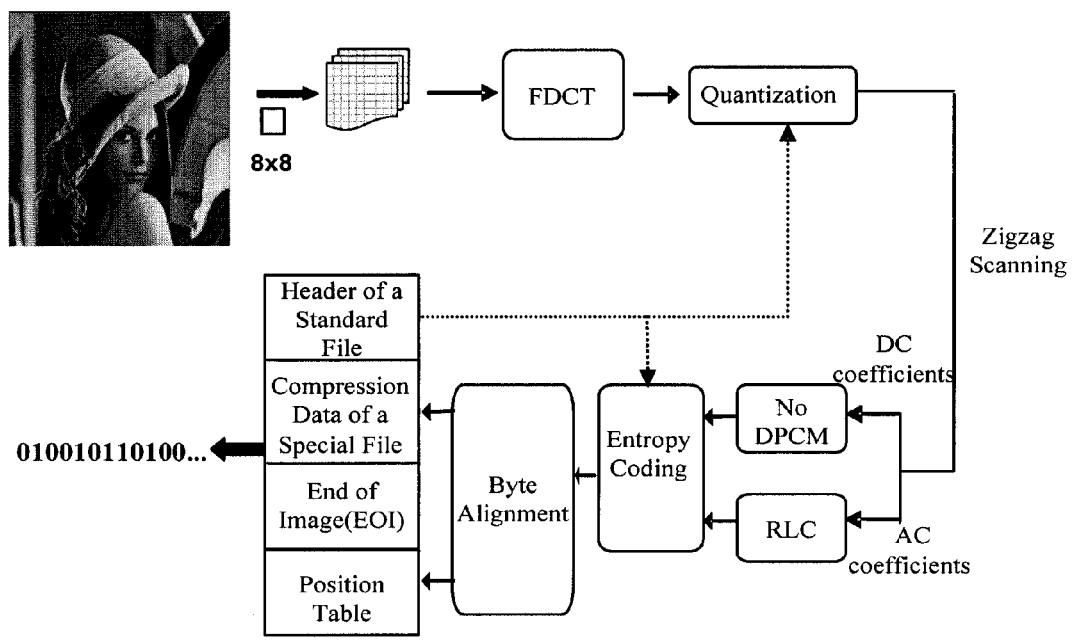
FIG. 3A and FIG. 3B each depicts a flowchart graphically illustrating a JPEG encoding method that supports decoding at a random access point in accordance with a first embodiment of the invention.
Figure 3B:
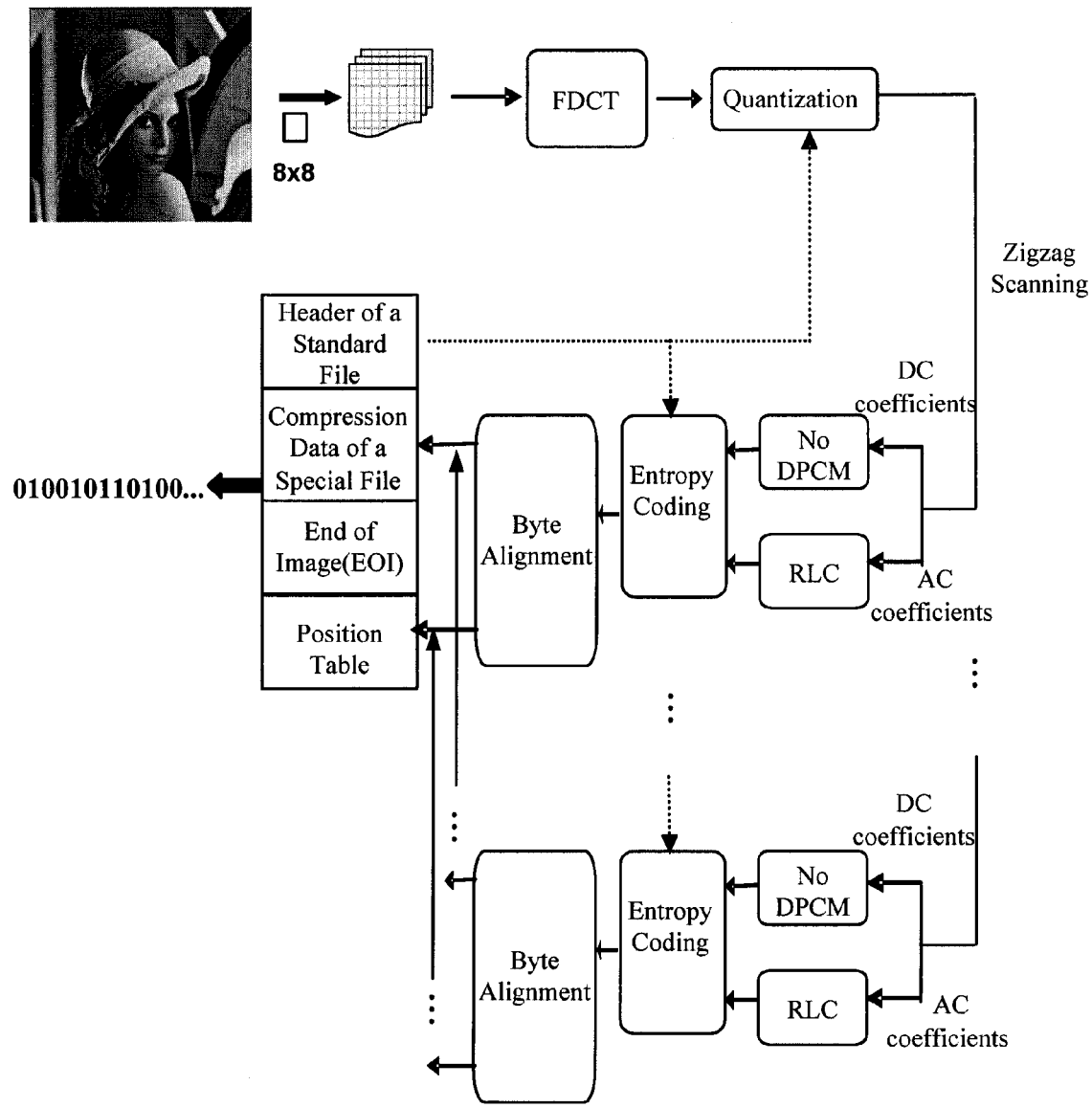
Figure 4:
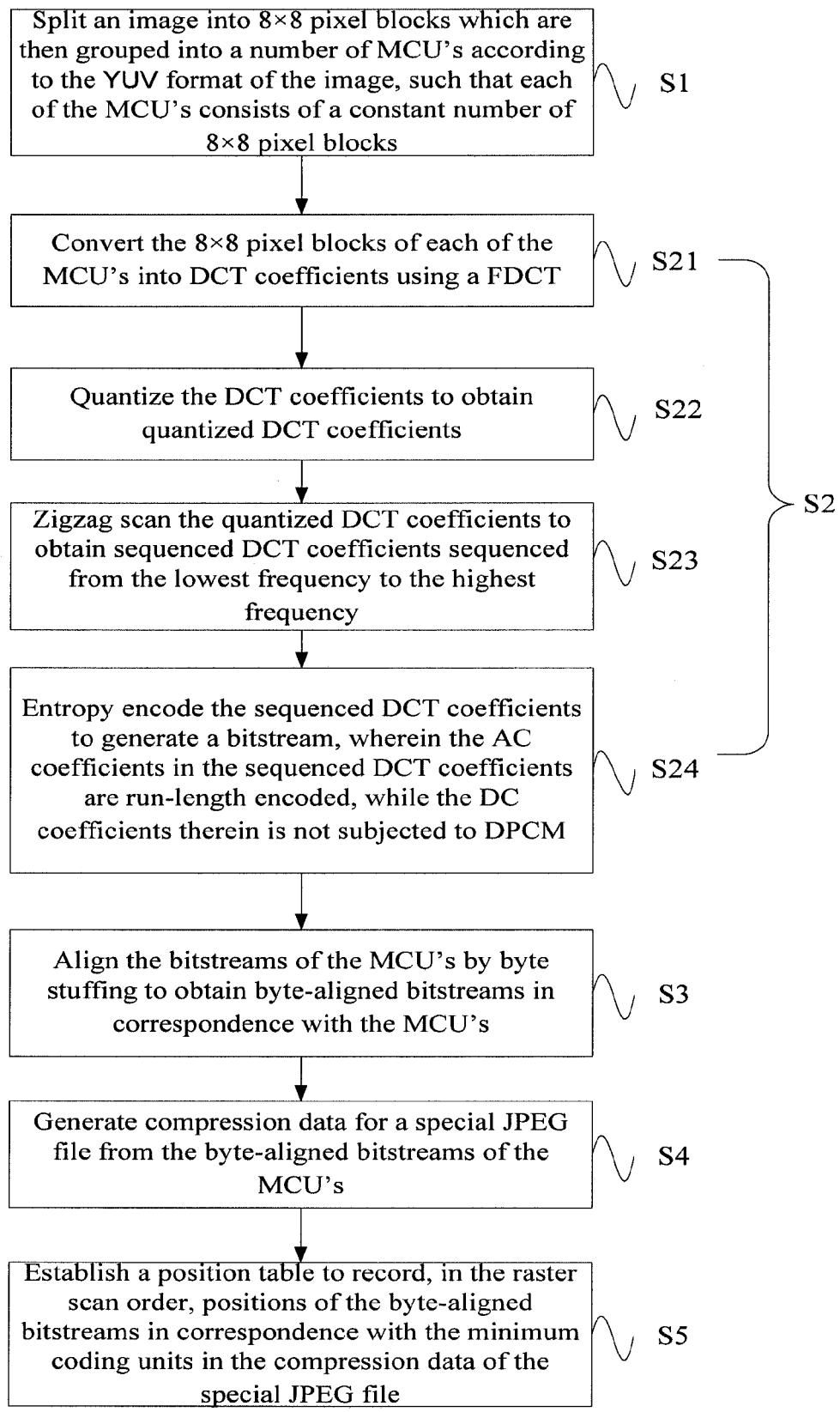
FIG. 4 is a more detailed flowchart of the JPEG encoding method of FIG. 3A.

In addition, as shown in FIG. 3B, the method in this example can use one or more encoding engines to achieve parallel encoding due to the elimination of the inter block correlation existed in standard JPEG encoding methods. Such parallel encoding may be achieved by using software (e.g. adopting multithread coding) or hardware (e.g. adopting parallel encoding modules) to greatly improve the processing speed.

Example 2

Figure 7A:
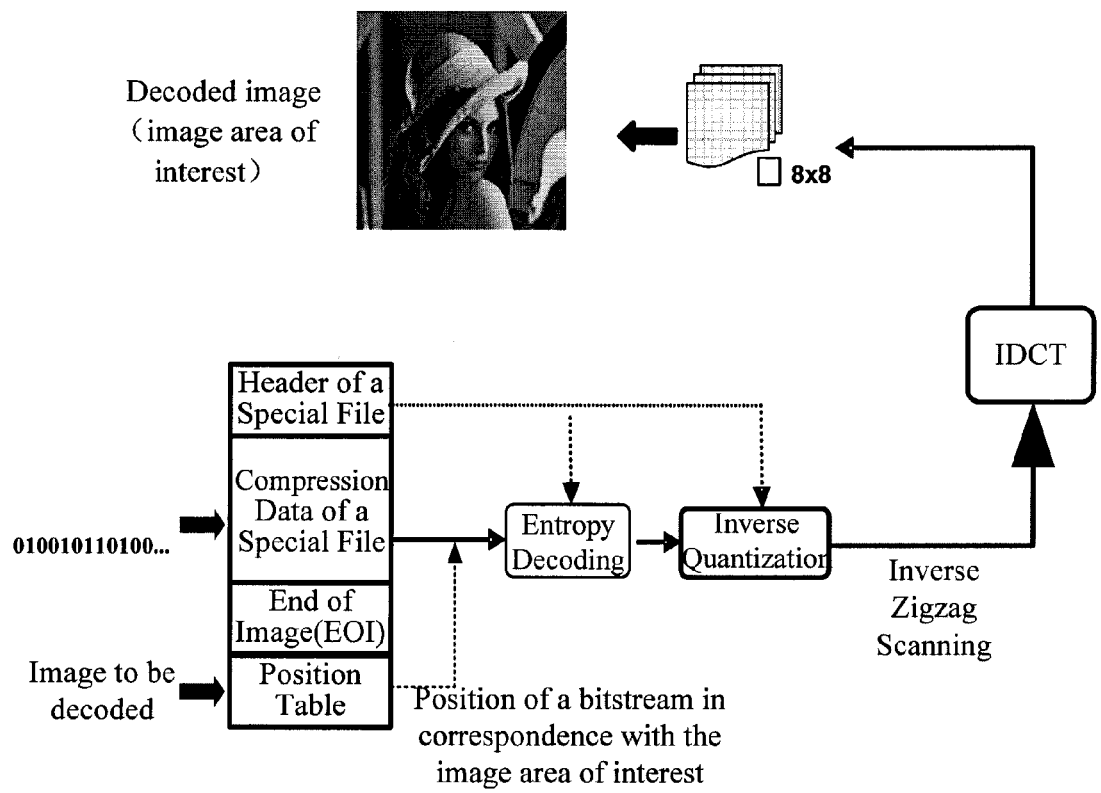
FIG. 7A and FIG. 7B each depicts a flowchart graphically illustrating a JPEG decoding method that supports decoding at a random access point in accordance with a second embodiment of the invention.
Figure 8:
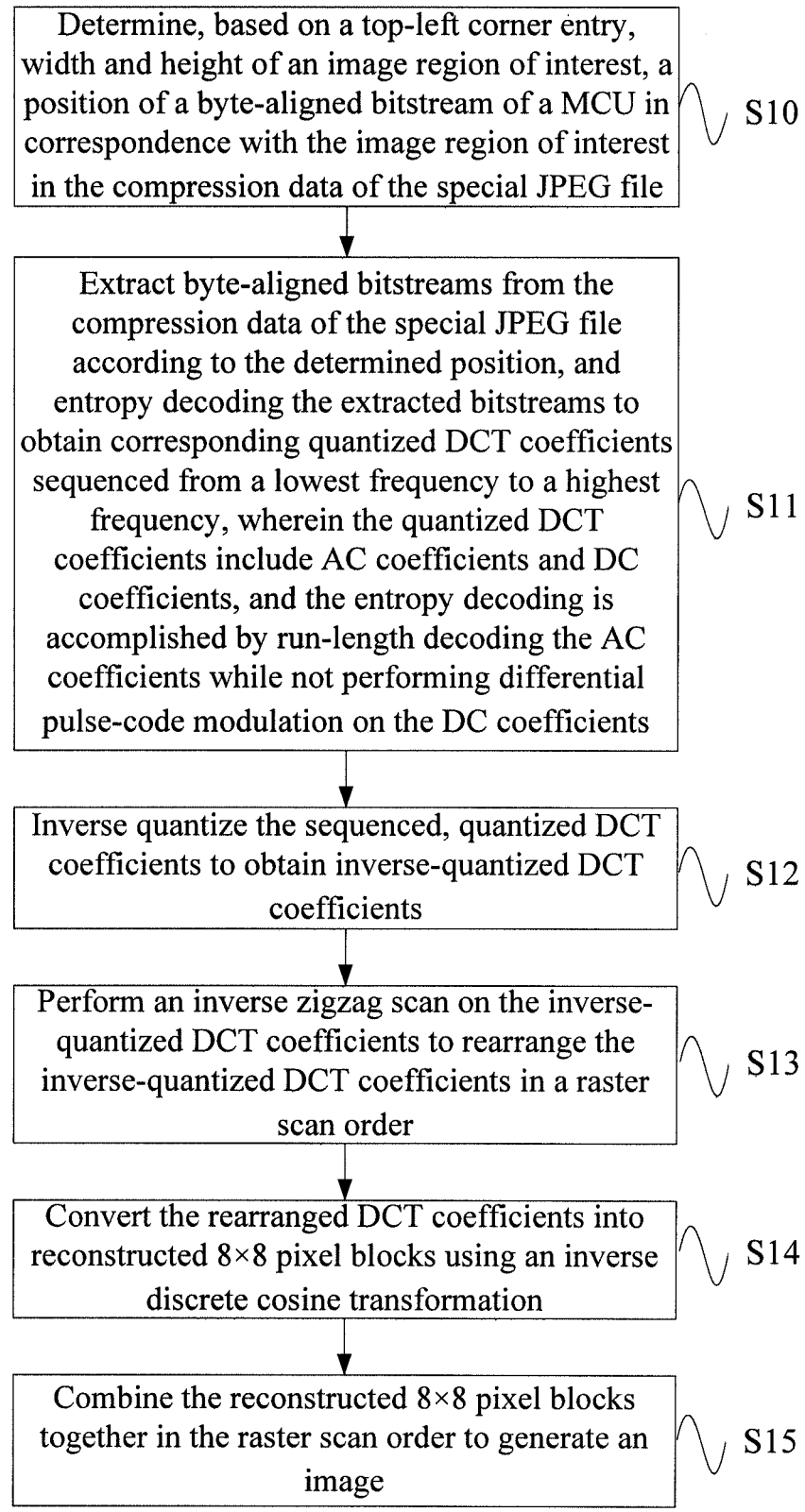
FIG. 8 is a more detailed flowchart of the JPEG decoding method of FIG. 7A.

FIGS. 7A and 8 show a method for decoding the special JPEG file generated from the method of Example 1. The decoding method includes the following steps S10 to S15.

In step S10, based on the top-left corner entry, width and height of an image region of interest, the position of a byte-aligned bitstream of a MCU in correspondence with the image region of interest in the compression data of the special JPEG file is found out through querying the position table.

In step S11, byte-aligned bitstreams of the MCU's are extracted from the compression data according to the determined position, and the extracted bitstreams are entropy decoded to recover corresponding quantized DCT coefficients sequenced from the lowest frequency to the highest frequency, wherein the quantized DCT coefficients include AC coefficients and DC coefficients, and the AC coefficients are recovered by run-length decoding, while the DC coefficients are recovered without performing differential pulse-code demodulation.

In step S12, the quantized DCT coefficients sequenced from the lowest frequency to the highest frequency are inverse-quantized.

In step S13, an inverse zigzag scan is performed on the inverse-quantized DCT coefficients to rearrange the inverse-quantized DCT coefficients in a raster scan order.

In step S14, an inverse discrete cosine transformation (IDCT) is carried out to convert the rearranged DCT coefficients into the reconstructed 8×8 pixel blocks.

In step S15, the reconstructed 8×8 pixel blocks are combined together in the raster scan order to generate a decompressed image.

In addition, the header of the special JPEG file can be read out and decoded using the method specified in the JPEG standard. Decoding at a random access point can be achieved by this method, through first determining the MCU based on the top-left corner entry, width and height of the image region of interest as well as the input format of the image, such as a YUV format, and then querying the position table to find the position of bitstream of the MCU in the compression data of the special JPEG file. Since the DC coefficient of any MCU is not subject to DPCM during the encoding process, the method allows independent decoding of each MCU and parallel decoding of multiple MCU's.

Advantageously, the method in this example can enable fast positioning of MCU bitstreams corresponding to an image region of interest without completely scanning the compression data of the special JPEG file and independent decompression of each of the MCU's, thereby allowing decoding at a random access point, namely, decompression of part of an image.

Figure 7B:
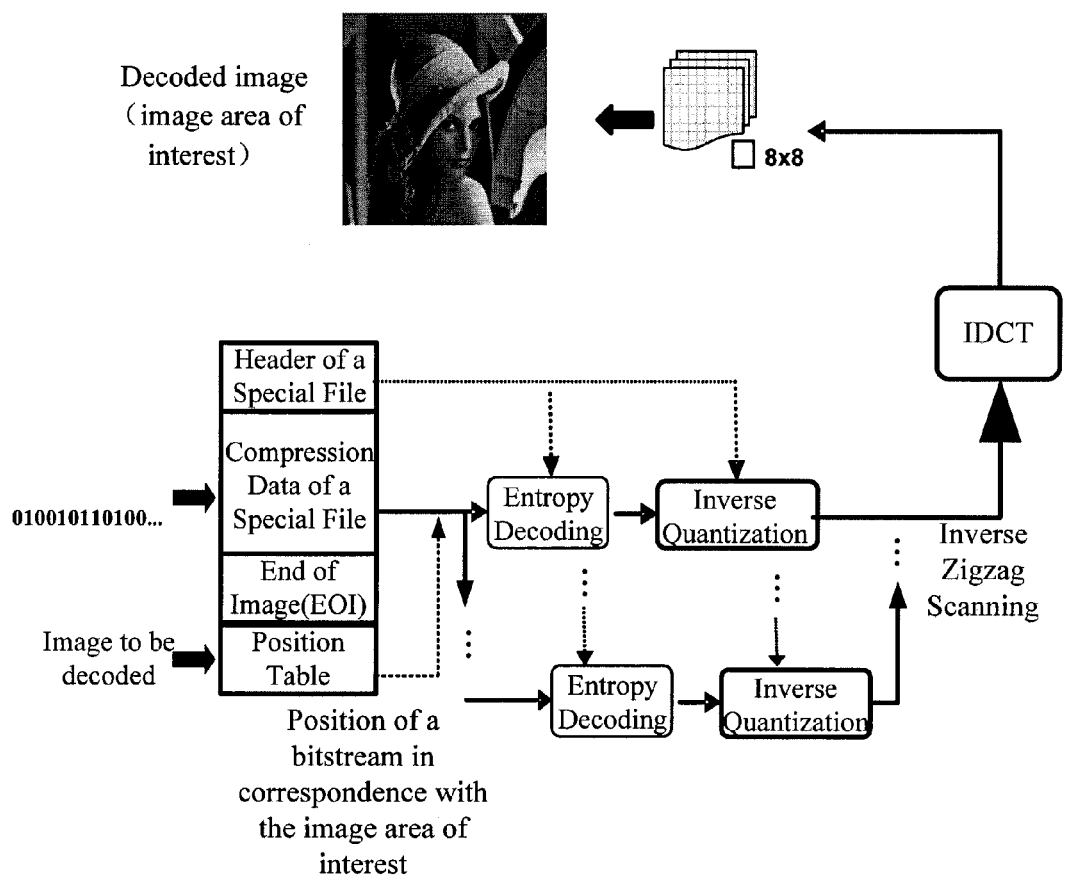

In addition, as shown in FIG. 7B, the method in this example can use one or more decoding engines to achieve parallel decoding due to the elimination of the inter block correlation existed in standard JPEG decoding methods. Such parallel encoding may be achieved by using software (e.g. adopting multithread coding) or hardware (e.g. adopting parallel decoding modules) to greatly improve the processing speed.

Example 3

Figure 9:
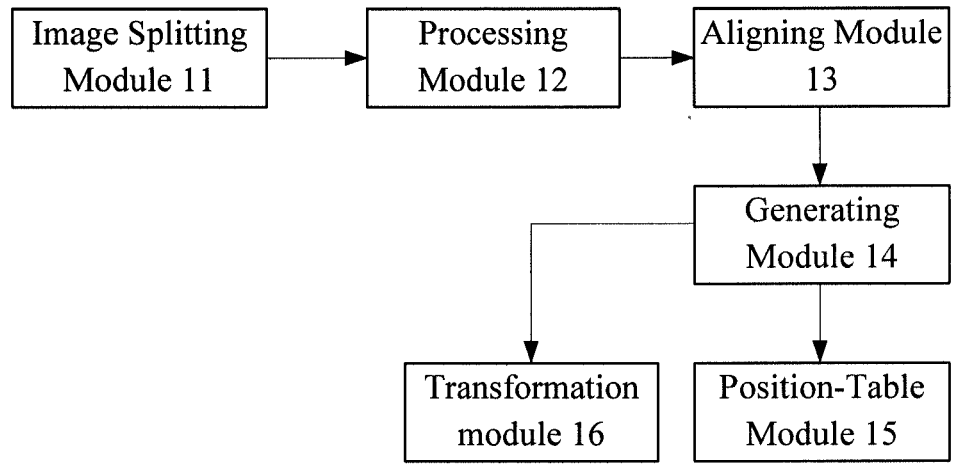
FIG. 9 schematically illustrates the functional modules of a JPEG encoding system that supports decoding at a random access point in accordance with a third embodiment of the invention.

Referring to FIG. 9, the invention also provides a JPEG encoding system that supports decoding at a random access point. As illustrated, the system includes an image splitting module 11, a processing module 12, an aligning module 13, a generating module 14 and a position-table module 15.

Imaging splitting module 11 is configured to split an input image into 8×8 pixel blocks and then group them into a number of MCU's according to the format of the image, such that each of the MCU's consists of a constant number of 8×8 pixel blocks.

Preferably, the format of the image is a YUV format, such as YUV422, YUV444 or YUV420.

Processing module 12 is configured to process the MCU's in the raster scan order, as illustrated in FIG. 6, by subjecting each MCU sequentially to FDCT for converting the 8×8 pixel blocks of each of the MCU's into DCT coefficients, quantization of the DCT coefficients using a quantization table to obtain quantized DCT coefficients, zigzag scanning for sequencing the quantized DCT coefficients from the lowest frequency to the highest frequency, and entropy encoding for converting the sequenced DCT coefficients into a bitstream, wherein the sequenced DCT coefficients include AC coefficients and DC coefficients while not performing differential pulse-code modulation (DPCM) on the DC coefficients.

Aligning module 13 is configured to aligning the bitstreams of the MCU's by byte stuffing to obtain byte-aligned bitstreams in correspondence with the MCU's.

Preferably, the byte stuffing is accomplished by the insertion of zeros.

Specifically, each of the MCU's undergoes, in the raster scan order, the same FDCT, quantization and zigzag scanning processes as in a standard JPEG encoder. However, the system of the invention differs from the standard JPEG encoder in not subjecting the DC coefficients to DPCM during the entropy encoding and in generating byte aligned MCUs in bitstreams by inserting zeros.

Generating module 14 is configured to generate compression data for a special JPEG file from the byte-aligned MCU bitstreams.

Preferably, generating module 14 is further configured to generate SOI, EOI, Tables and Frame header/Scan header for the special JPEG file. The header can keep the same format as header of a standard JPEG file. Additionally, for commercially available hardware encoders of some types, the header may be made in a stereotype format and even assume a fixed size. Furthermore, the EOI of the special JPEG file can be created in the same manner as how a standard JPEG encoder generates EOI for a standard JPEG file, i.e., adding a 2-byte EOI "0x FF D9" immediately after the end of the bitstreams.

Position-table module 15 is configured to establish a position table recording, in the raster scan order, positions of the byte-aligned bitstreams in correspondence with the MCU's in the compression data. As shown in FIG. 6, each cell of the table holds information indicative of the position of the byte-aligned bitstream of a corresponding MCU.

Preferably, the position table records each position of the byte-aligned MCU bitstreams in storage spaces of the same size. In a specific embodiment, in the position table, each position of the byte-aligned MCU bitstreams is stored in the order where the MCU's are raster scanned, each in a space of 4 bytes, as values ascending from zero (i.e., the position of the first byte-aligned MCU bitstream is recorded as the value zero), taking one bit as the minimum recording unit (for large-sized images, one byte can also be used as the minimum recording unit). As such, the number of total bytes storing the position table is 4 times the number of the MCU's. For example, a VGA image in the format of YUV422 will be divided into (640/16)×(480/8)=2400 MCU's and a position table for storing their bitstream positions having a size of 2400×4=9600 bytes will be established.

Preferably, the size of the storage spaces is 4 bytes.

Preferably, JPEG encoding system further includes a transcoding module 16, configured to transcode the header of the special JPEG file to a standard header by adding thereto a JPEG DRI marker that specifies a restart interval between the MCU's, transcode the compression data of the special JPEG file to standard compression data by inserting therein a restart marker at the end of each of the MCU's, and create a standard JPEG file from the standard compression data, SOI, EOI, Tables and Frame header/Scan header. As such, the special JPEG file can be conveniently transcoded to a standard JPEG file. The JPEG DRI marker may be "0x FF DD 00 04 00 01". More specifically, the restart markers may be added, with 2 bytes cycling from "0x FF D0" to "0x FF D7"; in accordance with the JPEG standard, each MCU bitstream may be added, by querying the position table or during the encoding process, with a restart marker immediately next to the end thereof, which cycles in value from 0 to 7.

Advantageously, the system in this example can enable fast positioning of MCU bitstreams corresponding to an image region of interest without completely scanning the compression data of the special JPEG file and independent decompression of each of the MCU's, thereby allowing decoding at a random access point, namely, decompression of part of an image.

Example 4

Figure 10:
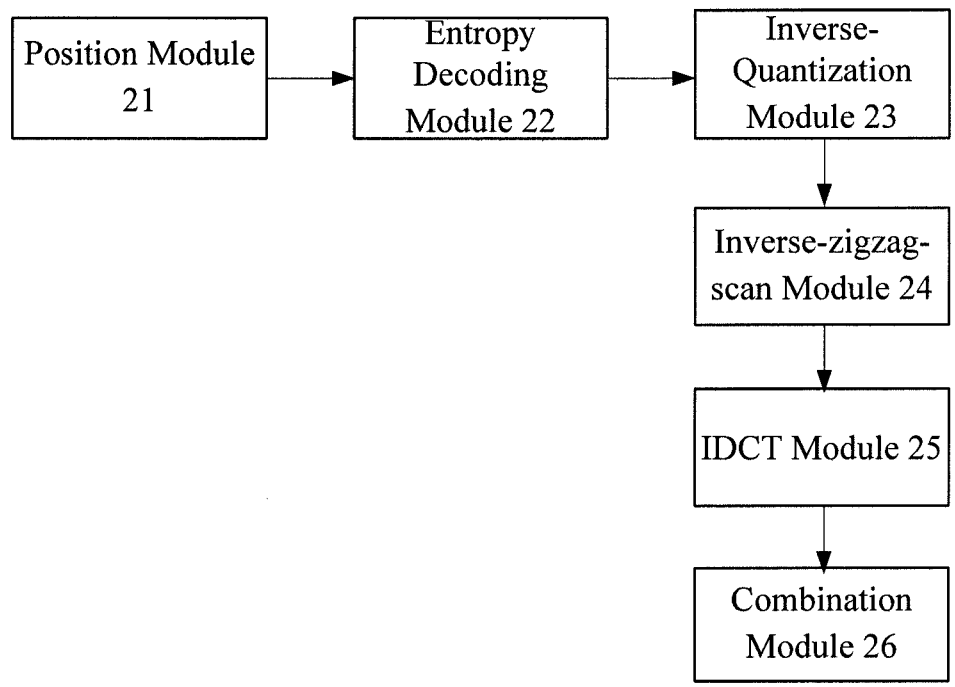
FIG. 10 schematically illustrates the functional modules of a JPEG decoding system that supports decoding at a random access point in accordance with a fourth embodiment of the invention.

Referring to FIG. 10, the invention further provides a JPEG decoding system for decoding the special JPEG file generated from the system of Example 3. As illustrated, the decoding system includes a position module 21, an entropy decoding module 22, an inverse-dequantization module 23, an inverse-zigzag-scan module 24, an IDCT module 25 and a combination module 26.

Position module 21 is configured to find out, based on the top-left corner entry, width and height of an image region of interest, the position of a byte-aligned bitstream of a MCU in correspondence with the image region of interest in the compression data of the special JPEG file through querying the position table.

Entropy decoding module 22 is configured to extract the byte-aligned bitstreams from the compression data according to the determined position, and to entropy decode the extracted bitstreams to recover corresponding quantized DCT coefficients sequenced from the lowest frequency to the highest frequency, wherein the quantized DCT coefficients include AC coefficients and DC coefficients, and the AC coefficients are recovered by run-length decoding, while the DC coefficients are recovered without performing differential pulse-code demodulation.

Inverse-quantization module 23 is configured to inverse-quantize the quantized DCT coefficients sequenced from the lowest frequency to the highest frequency.

Inverse-zigzag-scan module 24 is configured to perform an inverse zigzag scan on the inverse-quantized DCT coefficients to rearrange them in a raster scan order.

IDCT module 25 is configured to carry out an IDCT to convert the rearranged DCT coefficients into the reconstructed 8×8 pixel blocks.

Combination module 26 is configured to combine the reconstructed 8×8 pixel blocks together in the raster scan order to generate a decompressed image.

In addition, the decoding system may further incorporate a functional block for reading out and decoding the header of the special JPEG file as specified in the JPEG standard. Decoding at a random access point can be achieved by this system, through first determining the MCU based on the top-left corner entry, width and height of the image region of interest as well as the input format of the image, such as the YUV format, and then querying the position table to find the position of bitstream of the MCU in the compression data of the special JPEG file. Since the DC coefficient of any MCU is not subject to DPCM during the encoding process, the system allows each independent decoding of each MCU and parallel decoding of multiple MCU's.

Advantageously, the system in this example can enable fast positioning of MCU bitstreams corresponding to an image region of interest without completely scanning the compression data of the special JPEG file and independent decompression of each of the MCU's, thereby allowing decoding at a random access point, namely, decompression of part of an image.

As indicated above, the encoding method and system of the present invention can enable fast positioning of the byte-aligned bitstreams corresponding to an image region of interest without completely scanning the compression data of the special JPEG file and independent decompression of each of the MCU's, thereby allowing decoding at a random access point, namely, decompression of part of an image, by: splitting an image into 8×8 pixel blocks and grouping the 8×8 pixel blocks into a number of minimum coded units according to a format of the image, such that each minimum coded unit consists of a constant number of 8×8 pixel blocks; scanning the minimum coded units in a raster scan order, by subjecting each minimum coded unit sequentially to forward discrete cosine transformation for converting the 8×8 pixel blocks of each minimum coded unit into discrete cosine transformation (DCT) coefficients, quantization of the DCT coefficients using a quantization table to obtain quantized DCT coefficients, zigzag scanning the quantized DCT coefficients to obtain sequenced DCT coefficients sequenced from a lowest frequency to a highest frequency, and entropy encoding for converting the sequenced DCT coefficients into bitstreams in correspondence with the minimum coded units, wherein the sequenced DCT coefficients include AC coefficients and DC coefficients, and the entropy encoding is accomplished by run-length encoding the AC coefficients while not performing differential pulse-code modulation on the DC coefficients; aligning the bitstreams by byte stuffing to obtain byte-aligned bitstreams in correspondence with the minimum coded units; generating compression data of a special JPEG file from the byte-aligned bitstreams; and establishing a position table to record, in the raster scan order, positions of the byte-aligned bitstreams in correspondence with the minimum coded units in the compression data of the special JPEG file.

Also advantageously, the decoding method and system of the invention can also enable fast positioning of the byte-aligned bitstreams corresponding to an image region of interest without completely scanning the compression data of the special JPEG file and independent decompression of each of the MCU's, thereby allowing decoding at a random access point, namely, decompression of part of an image, by: determining, based on a top-left corner entry, width and height of an image region of interest, a position of a byte-aligned bitstream of a minimum coded unit in correspondence with the image region of interest in the compression data of the special JPEG file; extracting byte-aligned bitstreams from the compression data of the special JPEG file according to the determined position, and entropy decoding the extracted bitstreams to obtain corresponding quantized DCT coefficients sequenced from a lowest frequency to a highest frequency, wherein the quantized DCT coefficients include AC coefficients and DC coefficients, and the entropy encoding is accomplished by run-length encoding the AC coefficients while not performing differential pulse-code modulation on the DC coefficients; inverse quantizing the sequenced, quantized DCT coefficients to obtain inverse-quantized DCT coefficients; performing an inverse zigzag scan on the inverse-quantized DCT coefficients to rearrange the inverse-quantized DCT coefficients in a raster scan order; converting the rearranged DCT coefficients into reconstructed 8×8 pixel blocks using an inverse discrete cosine transformation; and combining the reconstructed 8×8 pixel blocks together in the raster scan order to generate an image.

Still advantageously, the encoding and decoding methods and systems of the invention can conveniently transcode the special JPEG file to a standard JPEG file by: transcoding the header of the special JPEG file to a standard header by adding thereto a JPEG DRI marker that specifies a restart interval between the minimum coded units, wherein the JPEG DRI marker is "0x FF DD 00 04 00 01"; transcoding the compression data of the special JPEG file to standard compression data by inserting therein a restart marker at the end of each minimum coded unit, wherein the restart markers is inserted, with 2 bytes thereof cycling from "0x FF DO" to "0x FF D7"; and creating a standard JPEG file from the standard compression data SOI, EOI, Tables and Frame header/Scan header.

It should be noted that, embodiments in the specification are described in a progressive manner, with differences therebetween being explained in emphasis. Thus, reference can be made for the same or similar elements between different embodiments. Specifically, the systems of Examples 3 and 4 are provided to implement the respective methods of Examples 1 and 2, and are thus explained relatively simply. A better understanding could be obtained by referencing the description of the systems.

Those of skill would further appreciate that the various illustrative modules and method steps described in connection with the embodiments disclosed herein may be implemented as electronic hardware, computer software, or combinations of both. To clearly illustrate this interchangeability of hardware and software, various illustrative modules and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

It is apparent that those skilled in the art can make various changes and modifications without departing from the spirit and scope of the present invention. It is therefore intended that the invention covers all such changes and modifications that are within the scope of the appended claims and their equivalents.

What is claimed is:

1. A JPEG encoding method, comprising:
splitting an image into 8×8 pixel blocks and grouping the 8×8 pixel blocks into a number of minimum coded units according to a format of the image, such that each of the minimum coded units consists of a constant number of 8×8 pixel blocks;
scanning the minimum coded units in a raster scan order, by subjecting each of the minimum coded units sequentially to forward discrete cosine transformation for converting the 8×8 pixel blocks of each of the minimum coded units into discrete cosine transformation (DCT) coefficients, quantization of the DCT coefficients according to a quantization table to obtain quantized DCT coefficients, zigzag scanning the quantized DCT coefficients to obtain sequenced DCT coefficients sequenced from a lowest frequency to a highest frequency, and entropy encoding for converting the sequenced DCT coefficients into bitstreams in correspondence with the minimum coded units, wherein the sequenced DCT coefficients include AC coefficients and DC coefficients, and the entropy encoding is accomplished by run-length encoding the AC coefficients while not performing differential pulse-code modulation on the DC coefficients;
aligning the bitstreams by byte stuffing to obtain byte-aligned bitstreams in correspondence with the minimum coded units;
generating compression data of a special JPEG file from the byte-aligned bitstreams;
acquiring, in the raster scan order, positions of the byte-aligned bitstreams in correspondence with the minimum coded units in the compression data of the special JPEG file, wherein a position of a first byte-aligned bitstream is recorded as zero; and
encoding the positions by a run-length coding and compressing the encoded positions by a Huffman coding to establish a position table.

2. The JPEG encoding method of claim 1, wherein the image is of a YUV format.

3. The JPEG encoding method of claim 1, wherein the byte stuffing includes inserting zeros to align the bitstreams.

4. The JPEG encoding method of claim 1, wherein establishing a position table includes recording the positions of the byte-aligned bitstreams in correspondence with the minimum coded units in the compression data of the special JPEG file in storage spaces having a same size.

5. The JPEG encoding method of claim 4, wherein the same size of the storage spaces is 4 bytes.

6. The JPEG encoding method of claim 1, wherein the special JPEG file further includes, besides the compression data, a start of image (SOI), an end of image (EOI), tables and a frame header/scan header, respectively the same as an SOI, an EOI, tables and a frame header/scan header of a standard JPEG file.

7. The JPEG encoding method of claim 6, further comprising the following steps after generating compression data of a special JPEG file or after establishing a position table:
transcoding the header of the special JPEG file to a standard header by adding thereto a JPEG DRI marker that specifies a restart interval between the minimum coded units, wherein the JPEG DRI marker code is "0x FF DD 00 04 00 01";
transcoding the compression data of the special JPEG file to standard compression data by inserting therein a restart marker at an end of each of the minimum coded units, wherein the restart marker is inserted, with 2 bytes thereof cycling from "0x FF D0" to "0x FF D7"; and
creating a standard JPEG file from the standard compression data, the SOI, the EOI, the tables and the frame header/scan header.

8. A method of decoding a special JPEG file established according to the method of claim 6, comprising:
determining, based on a top-left corner entry, a width and a height of an image region of interest, a position of a byte-aligned bitstream of a minimum coded unit in correspondence with the image region of interest in the compression data of the special JPEG file;
extracting byte-aligned bitstreams from the compression data of the special JPEG file according to the determined position, and entropy decoding the extracted bitstreams to obtain corresponding quantized DCT coefficients sequenced from a lowest frequency to a highest frequency, wherein the quantized DCT coefficients include AC coefficients and DC coefficients, and the entropy encoding is accomplished by run-length encoding the AC coefficients while not performing differential pulse-code modulation on the DC coefficients;
inverse quantizing the sequenced, quantized DCT coefficients to obtain inverse-quantized DCT coefficients;
performing an inverse zigzag scan on the inverse-quantized DCT coefficients to rearrange the inverse-quantized DCT coefficients in a raster scan order;
converting the rearranged DCT coefficients into reconstructed 8×8 pixel blocks using an inverse discrete cosine transformation; and
combining the reconstructed 8×8 pixel blocks together in the raster scan order to generate an image.

9. A JPEG encoding system, comprising:
an image splitting module for splitting an image into 8×8 pixel blocks and grouping the 8×8 pixel blocks into a number of minimum coded units according to a format of the image, such that each of the minimum coded units consists of a constant number of 8×8 pixel blocks;
a scanning module for scanning the minimum coded units in a raster scan order, by subjecting each of the minimum coded units sequentially to forward discrete cosine transformation for converting the 8×8 pixel blocks of each of the minimum coded units into discrete cosine transformation (DCT) coefficients, quantization of the DCT coefficients using a quantization table to obtain quantized DCT coefficients, zigzag scanning the quantized DCT coefficients to obtain sequenced DCT coefficients sequenced from a lowest frequency to a highest frequency, and entropy encoding for converting the sequenced DCT coefficients into bitstreams in correspondence with the minimum coded units, wherein the sequenced DCT coefficients include AC coefficients and DC coefficients, and the entropy encoding is accomplished by run-length encoding the AC coefficients while not performing differential pulse-code modulation on the DC coefficients;
an aligning module for aligning the bitstreams by byte stuffing to obtain byte-aligned bitstreams in correspondence with the minimum coded units;
a generating module for generating compression data of a special JPEG file from the byte-aligned bitstreams; and a position-table module for acquiring, in the raster scan order, positions of the byte-aligned bitstreams in correspondence with the minimum coded units in the compression data of the special JPEG file, encoding the positions by a run-length coding and compressing the encoded positions by a Huffman coding to establish a position table, wherein a position of a first byte-aligned bitstream is recorded as zero.

10. The JPEG encoding system of claim 9, wherein the image is of a YUV format.

11. The JPEG encoding system of claim 9, wherein the aligning module aligns the bitstreams by inserting zeros.

12. The JPEG encoding system of claim 9, wherein the position-table module records the positions of the byte-aligned bitstreams in correspondence with the minimum coded units in the compression data of the special JPEG file in storage spaces having a same size.

13. The JPEG encoding system of claim 12, wherein the same size of the storage space is 4 bytes.

14. The JPEG encoding system of claim 9, wherein the generating module is further configured to generate an SOI, an EOI, tables and a frame header/scan header respectively as same as an SOI, an EOI, tables and a frame header/scan header of a standard JPEG file.

15. The JPEG encoding system of claim 14, further comprising a transcoding module configured to:
    transcode the header of the special JPEG file to a standard header by adding thereto a JPEG DRI marker that specifies a restart interval between the minimum coded units, wherein the JPEG DRI marker is "0x FF DD 00 04 00 01";
    transcode the compression data of the special JPEG file to standard compression data by inserting therein a restart marker at an end of each of the minimum coded units, wherein the restart markers is inserted, with 2 bytes thereof cycling from "0x FF D0" to "0x FF D7"; and
    create a standard JPEG file from the standard compression data, the SOI, the EOI, the tables and the frame header/scan header.

16. A JPEG decoding system for decoding a special JPEG file establised using the system of claim 14, the system comprising:
    a position module for determining, based on a top-left corner entry, a width and a height of an image region of interest, a position of a byte-aligned bitstream of a minimum coded unit in correspondence with the image region of interest in the compression data of the special JPEG file;
    an entropy decoding module for extracting byte-aligned bitstreams from the compression data of the special JPEG file according to the determined position, and entropy decoding the extracted bitstreams to obtain corresponding quantized DCT coefficients sequenced from a lowest frequency to a highest frequency, wherein the quantized DCT coefficients include AC coefficients and DC coefficients, and the entropy encoding is accomplished by run-length encoding the AC coefficients while not performing differential pulse-code modulation on the DC coefficients;
    an inverse-quantization module for inverse quantizing the sequenced, quantized DCT coefficients to obtain inverse-quantized DCT coefficients;
    an inverse-zigzag-scan module for performing an inverse zigzag scan on the inverse-quantized DCT coefficients to rearrange the inverse-quantized DCT coefficients in a raster scan order;
    an IDCT module for converting the rearranged DCT coefficients into reconstructed 8×8 pixel blocks using an inverse discrete cosine transformation; and
    a combination module for combining the reconstructed 8×8 pixel blocks together in the raster scan order to generate an image.

\* \* \* \* \*